US009785530B2

(12) United States Patent
Du

(10) Patent No.: US 9,785,530 B2
(45) Date of Patent: Oct. 10, 2017

(54) METHOD, DEVICE, AND SYSTEM FOR PROCESSING PCIE LINK FAULT

(71) Applicant: Huawei Technologies Co., Ltd., Shenzhen (CN)

(72) Inventor: Ge Du, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 222 days.

(21) Appl. No.: 14/806,078

(22) Filed: Jul. 22, 2015

(65) Prior Publication Data

US 2015/0324268 A1 Nov. 12, 2015

Related U.S. Application Data

(63) Continuation of application No. PCT/CN2014/074584, filed on Apr. 2, 2014.

(51) Int. Cl.
*G06F 11/00* (2006.01)
*G06F 11/30* (2006.01)
(Continued)

(52) U.S. Cl.
CPC ........ *G06F 11/3027* (2013.01); *G06F 11/221* (2013.01); *G06F 13/4022* (2013.01); *G06F 13/4221* (2013.01)

(58) Field of Classification Search
CPC ............. G06F 11/0703; G06F 11/0706; G06F 11/1423; G06F 11/221; G06F 11/2221;
(Continued)

(56) References Cited

U.S. PATENT DOCUMENTS 7,705,850 B1 * 4/2010 Tsu .................... G06F 13/28 345/501
7,756,123 B1  7/2010 Huang et al.
(Continued)

FOREIGN PATENT DOCUMENTS

CN  1808406 A   7/2006
CN  101872330 A  10/2010
(Continued)

OTHER PUBLICATIONS

Foreign Communication From a Counterpart Application, PCT Application No. PCT/CN2014/074584, English Translation of International Search Report dated Jan. 9, 2015, 2 pages.
(Continued)

*Primary Examiner* — Joshua P Lottich
(74) *Attorney, Agent, or Firm* — Conley Rose, P.C.

(57) ABSTRACT

In a Peripheral Component Interconnect Express (PCIe) system, a first PCIe apparatus determines that at least one of lanes of a link between the first PCIe apparatus and a second PCIe apparatus is disabled, wherein the link includes M lanes numbered in a first order. Based upon the determination, the first PCIe apparatus obtains a number N indicating a number of available lanes of the link by performing a lane negotiation with the second PCIe apparatus. Then, a processor determines that N<M/2. Based upon the determination, the first PCIe apparatus re-numbers at least some of the lanes of the link in a reverse order opposite to the first order as instructed by the processor. At last, the first PCIe apparatus continue to perform a negotiation with the second PCIe apparatus to obtain available lanes.

12 Claims, 4 Drawing Sheets

(51) Int. Cl.
*G06F 13/40* (2006.01)
*G06F 11/22* (2006.01)
*G06F 13/42* (2006.01)

(58) Field of Classification Search
CPC ............ G06F 11/3027; G06F 11/3041; G06F 11/3051
See application file for complete search history.

(56) References Cited

U.S. PATENT DOCUMENTS

| | | | | |
|---|---|---|---|---|
| 8,909,843 | B1* | 12/2014 | Choi | G06F 13/385 710/11 |
| 2005/0154946 | A1* | 7/2005 | Mitbander | G06F 11/221 714/724 |
| 2006/0161714 | A1 | 7/2006 | Sue | |
| 2009/0003335 | A1* | 1/2009 | Biran | H04L 45/00 370/389 |
| 2009/0006932 | A1* | 1/2009 | Biran | G06F 13/4282 714/807 |
| 2012/0144230 | A1 | 6/2012 | Buckland et al. | |
| 2013/0002396 | A1 | 1/2013 | Sato | |
| 2013/0159589 | A1* | 6/2013 | Takayama | G06F 13/4018 710/307 |
| 2013/0326286 | A1 | 12/2013 | Nagano et al. | |
| 2014/0003283 | A1 | 1/2014 | Koenen et al. | |
| 2014/0019654 | A1* | 1/2014 | Trivedi | G06F 13/387 710/107 |
| 2014/0082251 | A1* | 3/2014 | Li | G06F 13/4022 710/316 |
| 2014/0195833 | A1* | 7/2014 | Wang | G06F 1/3203 713/320 |
| 2014/0250246 | A1* | 9/2014 | Solomon | G06F 13/385 710/52 |

FOREIGN PATENT DOCUMENTS

| | | |
|---|---|---|
| CN | 102541790 A | 7/2012 |
| CN | 103440188 A | 12/2013 |
| EP | 1598744 A1 | 11/2005 |
| EP | 1681632 A2 | 7/2006 |
| JP | 2005182485 A | 7/2005 |
| JP | 2013012879 A | 1/2013 |
| JP | 2013254274 A | 12/2013 |

OTHER PUBLICATIONS

Foreign Communication From a Counterpart Application, PCT Application No. PCT/CN2014/074584, Written Opinion dated Jan. 9, 2015, 3 pages.
Foreign Communication From a Counterpart Application, European Application No. 14873118.5, Extended European Search Report dated Jan. 4, 2016, 8 pages.
Partial English Translation and Abstract of Japanese Patent Application No. JPA2005182485, Dec. 27, 2016, 35 pages.
Partial English Translation and Abstract of Japanese Patent Application No. JPA201312879, Dec. 27, 2016, 36 pages.
Partial English Translation and Abstract of Japanese Patent Application No. JPA2013254274, Dec. 27, 2016, 55 pages.
Foreign Communication From a Counterpart Application, Japanese Application No. 2016-510920, Japanese Office Action dated Nov. 1, 2016, 2 pages.
Foreign Communication From a Counterpart Application, Japanese Application No. 2016-510920, English Translation of Japanese Office Action dated Nov. 1, 2016, 2 pages.
Foreign Communication From a Counterpart Application, Chinese Application No. 201480000399.1, Chinese Office Action dated Sep. 5, 2016, 6 pages.
Foreign Communication From a Counterpart Application, Chinese Application No. 201480000399.1, Chinese Search Report dated Aug. 28, 2016, 2 pages.

* cited by examiner

METHOD, DEVICE, AND SYSTEM FOR PROCESSING PCIE LINK FAULT

CROSS-REFERENCE TO RELATED APPLICATIONS

This application is a continuation of International Application No. PCT/CN2014/074584, filed on 2 Apr. 2014, which is hereby incorporated by reference in its entirety.

TECHNICAL FIELD

The present invention relates to the field of data transmission technologies, and in particular, to a method, device, and system for processing a Peripheral Component Interconnect Express (PCIe) link fault.

BACKGROUND

Currently, in the field of data transmission technologies, the PCIe protocol has been widely applied. When the PCIe protocol is applied to devices, data transmission is performed between the devices in a point-to-point form. Devices performing data transmission by using the PCIe protocol are collectively referred to as PCIe apparatuses. In a system, a link connection can be implemented for communication between two PCIe apparatuses by using a Serializer/De-Serializer (serdes) circuit. When the two PCIe apparatuses perform data transmission, data transmission is performed by using the serdes at a negotiated rate. A link between the two PCIe apparatuses may include 1, 2, 4, 8, 16, or 32 serdes circuits. When there are multiple serdes circuits, these serdes circuits are successively numbered by using continuous numbers in ascending order. One serdes is one lane of the link, and a serdes number is referred to as a lane number.

A bandwidth (W) of data transmission between two PCIe apparatuses is equal to a product of a quantity of lanes (N) and a negotiated rate (S), that is, a bandwidth formula is W=N×S. The negotiated rate (S) of the link between the two PCIe apparatuses varies with a version of the used PCIe protocol, and currently, there are four types of negotiated rates, which are GEN1 (2.5 GT/s), GEN2 (5.0 GT/s), GEN3 (8.0 GT/s), and GEN4 (16.0 GT/s), indicating a capacity of data that can be transmitted by one circuit in one second. Generally, a negotiated rate (S) supported by a link of one PCIe apparatus is fixed, and in this case, to meet increasingly high user requirements of a communication bandwidth (W), the bandwidth can be improved only by increasing the quantity of lanes (N) of the link.

When two PCIe apparatuses transmit data, all lanes of a link between the two PCIe apparatuses need to be used simultaneously. If a fault occurs in one of the lanes, data transmission is interrupted. In the prior art, when a fault occurs in a lane connected to a PCIe apparatus, the PCIe apparatus performs link negotiation according to a re-negotiation mechanism of the PCIe protocol. During link negotiation, negotiation is performed starting from a lane with a smallest lane number, and link negotiation is successively performed in ascending order of lane number. A manner of performing link re-negotiation continuously in ascending order of lane number is referred to as upward negotiation. For example, when a fault occurs in a lane No. 2 of a PCIe apparatus that originally needs to negotiate for a rate of GEN2 and a link width of 16 (PCIe2.0×16), the PCIe apparatus performs link negotiation upward starting from a lane No. 0 according to the re-negotiation mechanism of the PCIe protocol. Negotiation cannot be performed successfully on the lane No. 2 because of the fault in the lane No. 2, and after negotiation is performed from the lane No. 0 to a lane No. 1, link negotiation cannot continue. In this case, negotiation is performed successfully only on 2 lanes: the lane No. 0 and the lane No. 1; that is, data transmission can continue only in the lane No. 0 and the lane No. 1. According to a lane width of a link between two PCIe apparatuses that is stipulated in the PCIe protocol, a lane width of the link between the two PCIe apparatuses is 2, which is obtained by means of re-negotiation; that is, only 2 lanes can be provided for the PCIe apparatuses to transmit data. In this case, N in the bandwidth formula is changed from the original 16 to 2, and performance of data transmission between the PCIe apparatuses is only ⅛ of original performance. However, if a fault occurs in the lane No. 1, only one lane can be negotiated for according to the foregoing re-negotiation method; in this case, data transmission performance is only 1/16 of the original performance.

It can be seen that in the prior art, when a fault occurs in a lane of a link between PCIe apparatuses, re-negotiation for a lane width of the link is greatly restricted by a lane number of the faulty lane, which leads to uncertainty about the lane width obtained by means of re-negotiation and a case in which the lane width is greatly reduced, severely affecting data transmission performance of a lane.

SUMMARY

In view of this, the present invention provides a method, device, and system for processing a PCIe link fault, so as to overcome the problem in the prior art that due to restriction of a lane number of a lane in which a fault occurs, uncertainty exists in a lane width obtained by means of re-negotiation and a case in which the lane width is greatly reduced may occur, which severely affects transmission performance of a lane.

A first aspect of the present invention provides a method for processing a PCIe link fault, including detecting, by a PCIe apparatus, that a fault occurs in a lane of a link between the PCIe apparatus and a downstream PCIe apparatus, and sending a Message Signaled Interrupts (MSI) message to a central processing unit (CPU), where the MSI message includes a device identification (ID) of the PCIe apparatus, negotiating, by the PCIe apparatus, with the downstream PCIe apparatus to obtain a current lane width value N, acquiring, by the CPU, a lane negotiation capability value M and the current lane width value N of the PCIe apparatus from the PCIe apparatus according to the device ID in the received MSI message, comparing, by the CPU, N and M/2, if N<M/2, instructing, by the CPU, the PCIe apparatus to perform a lane reversal operation, performing, by the PCIe apparatus, the lane reversal operation on the link between the PCIe apparatus and the downstream PCIe apparatus, and negotiating, by the PCIe apparatus, with the downstream PCIe apparatus to obtain a new current lane width value N', and continuing to perform data transmission with the downstream PCIe apparatus by using N' lanes.

In a first possible implementation manner of the first aspect, the method further includes: if N≥M/2, continuing, by the PCIe apparatus, to perform data transmission with the downstream PCIe apparatus by using N lanes obtained by means of negotiation.

With reference to the first aspect, or the first possible implementation manner of the first aspect, in a second possible implementation manner, if N<M/2, the method further includes: disabling, by the CPU, lanes No. 0 to No. (M/2−1) of the link between the PCIe apparatus and the downstream PCIe apparatus.

A second aspect of the present invention provides a method for processing a PCIe link fault, including receiving a MSI message reported by a PCIe apparatus, where the MSI message includes a device ID of the PCIe apparatus, acquiring a lane negotiation capability value M and a current lane width value N of the PCIe apparatus from the PCIe apparatus according to the device ID, where the current lane width value N is obtained by negotiating by the PCIe apparatus with a downstream PCIe apparatus, comparing N and M/2; and if N<M/2, instructing the PCIe apparatus to perform a lane reversal operation.

In a first possible implementation manner of the second aspect, if N<M/2, the method further includes disabling lanes No. 0 to No. (M/2−1) of a link between the PCIe apparatus and the downstream PCIe apparatus.

With reference to the second aspect, or the first possible implementation manner of the second aspect, in a second possible implementation manner, the lane negotiation capability value M of the PCIe apparatus is equal to a total quantity of lanes of the link between the PCIe apparatus and the downstream PCIe apparatus.

A third aspect of the present invention provides a method for processing a PCIe link fault, including detecting, by a PCIe apparatus, that a fault occurs in a lane of a link between the PCIe apparatus and a downstream PCIe apparatus, and sending a MSI message to a CPU, where the MSI message includes a device ID of the PCIe apparatus, negotiating with the downstream PCIe apparatus to obtain a current lane width value N, receiving an instruction of performing a lane reversal operation that is sent by the CPU, and performing the lane reversal operation on the link between the PCIe apparatus and the downstream PCIe apparatus, and negotiating with the downstream PCIe apparatus to obtain a new current lane width value N', and continuing to perform data transmission with the downstream PCIe apparatus by using N' lanes.

In a first possible implementation manner of the third aspect, the PCIe apparatus continues to perform data transmission with the downstream PCIe apparatus by using N lanes if the PCIe apparatus does not receive, within predetermined time, the instruction of performing a lane reversal operation that is sent by the CPU.

A fourth aspect of the present invention provides a system for processing a PCIe link fault, where the system includes a CPU, a PCIe apparatus, and a downstream PCIe apparatus, the CPU is connected to the PCIe apparatus, and the PCIe apparatus is connected to the downstream PCIe apparatus by using a link, where the PCIe apparatus is configured to detect whether a fault occurs in a lane of the link between the PCIe apparatus and the downstream PCIe apparatus, and report a MSI message to the CPU when a fault occurs, where the MSI message includes a device ID of the PCIe apparatus; the PCIe apparatus is further configured to negotiate with the downstream PCIe apparatus to obtain a current lane width value N, the CPU is configured to acquire a lane negotiation capability value M and the current lane width value N of the PCIe apparatus from the PCIe apparatus according to the device ID in the MSI message, and compare N and M/2; and when N<M/2, instruct the PCIe apparatus to perform a lane reversal operation, and the PCIe apparatus is further configured to: after receiving an instruction of performing a lane reversal operation that is sent by the CPU, perform the lane reversal operation on the link between the PCIe apparatus and the downstream PCIe apparatus, and negotiate with the downstream PCIe apparatus to obtain a new current lane width value N'.

In a first possible implementation manner of the fourth aspect, when N<M/2, the CPU is further configured to disable lanes No. 0 to No. (M/2−1) of the link between the PCIe apparatus and the downstream PCIe apparatus.

A fifth aspect of the present invention provides a PCIe apparatus for processing a PCIe link fault, including a detecting module, an MSI module, a negotiating module, a register, and a lane reversal module, where the register stores a current lane width value N and a lane negotiation capability value M of the PCIe apparatus, the detecting module is configured to monitor a communication condition of a link between the PCIe apparatus and a downstream PCIe apparatus, and when detecting that a fault occurs in a lane of the link, send a lane fault instruction message to the MSI module, the MSI module is configured to, after receiving the lane fault instruction message sent by the detecting module, send an MSI message to a CPU, where the MSI message carries a device ID of the PCIe apparatus, the negotiating module is configured to negotiate a lane width of the link between the PCIe apparatus and the downstream PCIe apparatus, and the lane reversal module is configured to, after receiving an instruction of performing a lane reversal operation that is sent by the CPU, perform the lane reversal operation on the lane of the link between the PCIe apparatus and the downstream PCIe apparatus.

It can be known from the foregoing technical solutions that, compared with the prior art, the present invention discloses the method, device, and system for processing a PCIe link fault, and by comparing a current lane width value of a PCIe apparatus and a lane negotiation capability value M, this method can ensure that a lane width of the PCIe apparatus remains half the lane negotiation capability value regardless of a lane number of a lane in which a fault occurs. The method, device, and system for processing a PCIe link fault that are disclosed in the present invention greatly ease the restriction of a lane number of a faulty lane that is imposed on link re-negotiation, so that an optimal link width can be achieved after re-negotiation.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely the embodiments of the present invention, and a person of ordinary skill in the art may still derive other drawings from the provided accompanying drawings.

DESCRIPTION OF EMBODIMENTS

The following clearly describes the technical solutions in the embodiments of the present invention with reference to the accompanying drawings in the embodiments of the present invention. The described embodiments are merely some but not all of the embodiments of the present invention.

Figure 1:
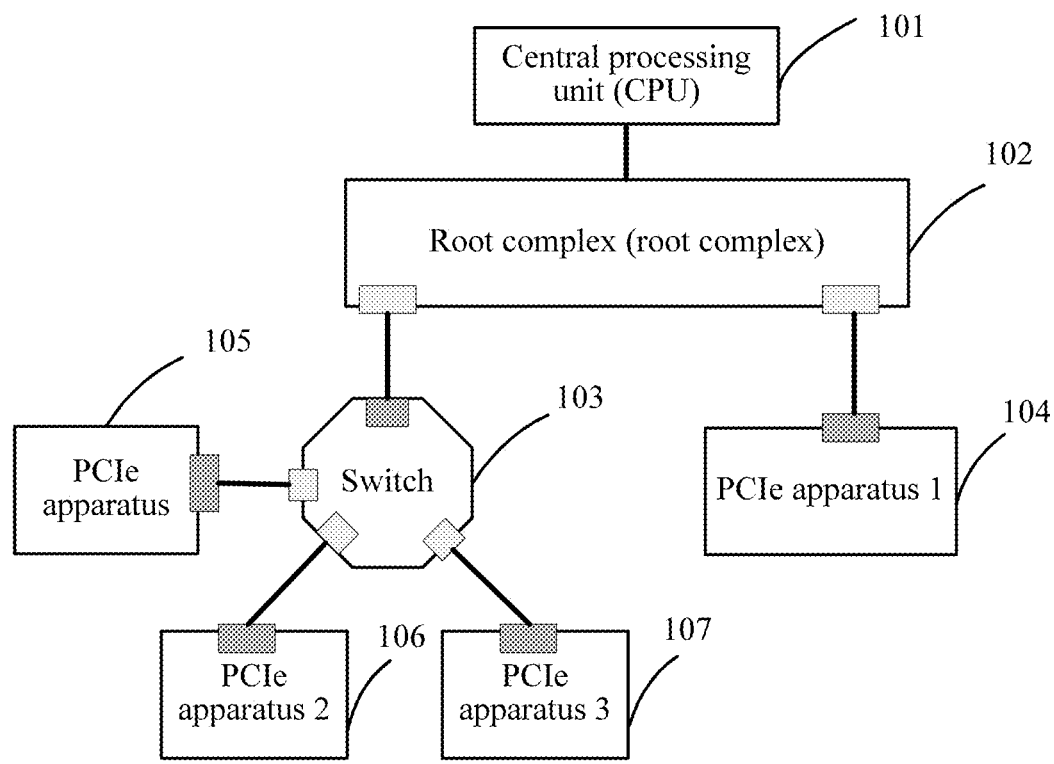
FIG. 1 is a schematic diagram of connections between PCIe apparatuses disclosed in an embodiment of the present invention.

The present invention provides a new method for processing a link fault of a PCIe device. Devices that perform data transmission by using the PCIe protocol are collectively referred to as PCIe apparatuses. A PCIe apparatus 105 may be a chip integrated in an independent device, or may be a physically independent device, which is not limited herein. For a connection relationship between the PCIe apparatuses, reference may be made to FIG. 1. As shown in FIG. 1, two PCIe apparatuses may be directly connected to perform data transmission, for example, a downstream port of a root complex (root complex) device is directly connected to an upstream port of a PCIe apparatus 1 104 to implement data transmission between the root complex and the PCIe apparatus 1 104. Data transmission may also be indirectly performed between the two PCIe apparatuses, for example, implementing data transmission by using a switch. For example, the downstream port of the root complex is connected to an upstream port of the switch, and a downstream port of the switch is connected to an upstream port of a PCIe apparatus 2 106, so as to implement data transmission between the root complex and the PCIe apparatus 2 106. One PCIe apparatus may be simultaneously connected to multiple PCIe apparatuses, and as shown in FIG. 1, the root complex 102 is simultaneously connected with the PCIe apparatus 1 104 and the switch 103. These PCIe apparatuses may be managed by a CPU 101 in a centralized manner.

Data transmission is implemented between two PCIe apparatuses by means of a link connection, and a link may be a serdes circuit. For example, the downstream port of the root complex is connected to the upstream port of the PCIe apparatus 1 104 by using multiple serdes circuits, and these serdes circuits form a link between the root complex and the PCIe apparatus 1 104. There may be 1, 2, 4, 8, 16, or 32 serdes circuits between two PCIe apparatuses, and a serdes between the two PCIe apparatuses forms a link between the two PCIe apparatuses. A bandwidth (W) of data transmission between two PCIe apparatuses is equal to a product of a quantity of lanes (N) and a negotiated rate (S), that is, a bandwidth formula is W=N×S. The negotiated rate (S) of a link between the two PCIe apparatuses varies with a version of the used PCIe protocol, and currently, there are four types of negotiated rates, which are GEN1 (2.5 GT/s), GEN2 (5.0 GT/s), GEN3 (8.0 GT/s), and GEN4 (16.0 GT/s), indicating a capacity of data that can be transmitted by one circuit in one second. Generally, a negotiated rate (S) supported by a link of one PCIe apparatus is fixed, and in this case, to meet increasingly high user requirements of a communication bandwidth (W), the bandwidth can be improved only by increasing the quantity of lanes (N) of the link.

When there are multiple serdes circuits, these serdes circuits are numbered successively by using continuous numbers in ascending order; in this case, one serdes is a lane (lane) of a link between two PCIe apparatuses, and a serdes number is referred to as a lane number. For example, lanes between the root complex and the PCIe apparatus 1 104 that are shown in FIG. 1 are numbered from left to right successively by using numbers 0 to 15. The serdes described herein uses an existing serdes structure and supports an existing function, which is not separately described herein again.

When two PCIe apparatuses are connected, one PCIe apparatus initiating link negotiation is referred to as an upstream PCIe apparatus, and the other one connected to the one PCIe apparatus is referred to as a downstream PCIe apparatus. As shown in FIG. 1, when the root complex 102 and the PCIe apparatus 1 104 are connected, the root complex is the upstream PCIe apparatus, and the PCIe apparatus 1 104 is the downstream PCIe apparatus. When the root complex 102 and the switch 103 are connected, the root complex 102 is the upstream PCIe apparatus, and the switch 103 is the downstream PCIe apparatus. The switch 103 is further connected to the PCIe apparatus 2 106; in this case, the switch is the upstream PCIe apparatus, and the PCIe apparatus 2 106 is the downstream PCIe apparatus. When one PCIe apparatus is simultaneously connected to multiple PCIe apparatuses, data transmission is performed between the one PCIe apparatus and every other PCIe apparatus by using an independent link. For example, a PCIe switch is simultaneously connected to the PCIe apparatus 2 106 and a PCIe apparatus 3 107; data transmission is implemented between the PCIe switch 103 and the PCIe apparatus 2 106 by using a link 1, and data transmission is implemented between the switch 103 and the PCIe apparatus 3 107 by using a link 2. The link 1 and the link 2 exist independent of each other, and do not affect each other. Quantities of lanes of the link 1 and the link 2 may be the same or may be different. However, data transmission is performed between the PCIe apparatuses by using the links in a same manner. In the following, description is provided by using an example of a method for processing a fault that occurs in a link between two PCIe apparatuses.

Figure 2:
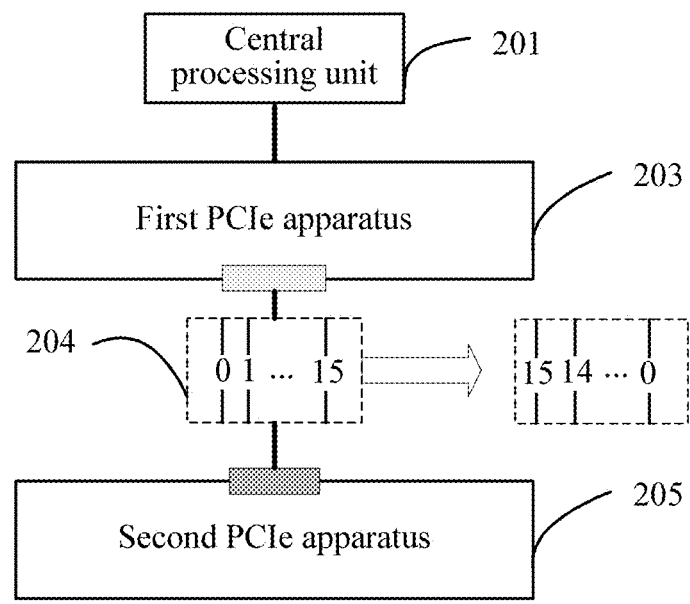
FIG. 2 is a simplified schematic diagram of a connection between PCIe apparatus disclosed in an embodiment of the present invention.

To make the entire process clearer and more explicit, as shown in FIG. 2, a connection relationship between two PCIe apparatuses is simplified, where a first PCIe apparatus is an upstream PCIe apparatus, and performs lane negotiation with a second PCIe apparatus. The second PCIe apparatus is a downstream PCIe apparatus. A CPU manages the two PCIe apparatuses. A link between the first PCIe apparatus and the second PCIe apparatus includes 16 serdes circuits, each serdes is a lane of the link between the first PCIe apparatus and the second PCIe apparatus, and the 16 lanes are continuously numbered starting from 0 to 15 from left to right. As shown in FIG. 2, a lane with a number 0 is referred to as a lane No. 0, a lane with a number 1 is referred to as a lane No. 1, and by analogy, a lane with a number 15 is a lane No. 15. The quantity of lanes herein is merely used for description. In actual use, 1, 2, 4, 8, or 32 lanes may be configured according to a requirement, and an implementation principle thereof is the same as an implementation principle of the 16 lanes.

An MSI function is configured in the first PCIe apparatus. When detecting that a fault occurs in one or more lanes of the link connected between the first PCIe apparatus and the second PCIe apparatus, the first PCIe apparatus reports an MSI message to the CPU, where the MSI message carries a device ID of the first PCIe apparatus. The first PCIe apparatus stores a lane number of the faulty lane in a register. The first PCIe apparatus performs lane re-negotiation with the second PCIe apparatus according to a re-negotiation mechanism of the PCIe protocol, to obtain a current lane width value N of the link between the first PCIe apparatus and the second PCIe apparatus. During lane re-negotiation, according to a lane negotiation mechanism stipulated in the PCIe protocol, the first PCIe apparatus continuously performs link negotiation with the second PCIe apparatus upward in ascending order of lane number, starting from a lane with a smallest lane number until negotiation is performed on the faulty lane. Because negotiation cannot be successfully performed on the faulty lane, the re-negotiation process is terminated. The first PCIe apparatus further determines the current lane width value N of the link according to a quantity of lanes of a link between two PCIe apparatuses that is specified in the PCIe protocol. Because lane numbers need to be continuous, and link negotiation starts from a lane with a smallest number, a quantity of lanes obtained by means of re-negotiation varies with a lane number of a faulty lane, and uncertainty exists. When the lane number of the faulty lane is relatively small, the quantity of lanes obtained by means of re-negotiation is also greatly reduced, that is, the obtained current lane width value N is greatly reduced, therefore severely affecting performance of data transmission between the two PCIe apparatuses. For example, when a fault occurs in a lane No. 3 between the first PCIe apparatus and the second PCIe apparatus, the first PCIe apparatus performs, starting from the lane No. 0, link negotiation with the second PCIe apparatus according to the negotiation mechanism of the PCIe protocol. No fault occurs in the lane No. 0, and therefore negotiation succeeds; negotiation proceeds to the lane No. 1 and negotiation on the lane No. 1 succeeds; negotiation proceeds to a lane No. 2, negotiation on the lane No. 2 succeeds, and negotiation proceeds to the lane No. 3. Because the fault occurs in the lane No. 3, negotiation cannot be performed successfully. Further, because the lane numbers need to be continuous, negotiation cannot continue after being interrupted on the lane No. 3. In this case, only 3 lanes, that is, the lane No. 0, the lane No. 1, and the lane No. 2 are available. In addition, because a link between two PCIe apparatuses may include 1, 2, 4, 8, 16, or 32 lanes according to the PCIe protocol, the current lane width value N obtained by negotiation between the first PCIe apparatus and the second PCIe apparatus is 2. Originally, there are 16 lanes between the first PCIe apparatus and the second PCIe apparatus that can be used to perform data transmission, but after the fault occurs in the lane No. 3, there are only 2 lanes that are obtained by means of re-negotiation and that can be used to perform data transmission, which is ⅛ of the original. In this case, a lane width of the link between the first PCIe apparatus and the second PCIe apparatus is greatly reduced, and data transmission performance deteriorates obviously. If a fault occurs in the lane No. 1 between the first PCIe apparatus and the second PCIe apparatus, similarly, only the lane No. 0 is available. In this case, the current lane width value N obtained by re-negotiation between the first PCIe apparatus 203 and the second PCIe apparatus is 1, which is 1/16 of the original, and data transmission performance deteriorates significantly.

In this embodiment of the present invention, after receiving the MSI message reported by the first PCIe apparatus, the CPU enters an interrupt processing process. The CPU acquires the current lane width value N of the first PCIe apparatus and a lane negotiation capability value M of the first PCIe apparatus from the first PCIe apparatus according to the device ID of the first PCIe apparatus in the MSI message. The lane negotiation capability value M of the first PCIe apparatus refers to a maximum lane width value that can be obtained by negotiating by the first PCIe apparatus with the second PCIe apparatus. The maximum lane width value that can be obtained by negotiating by the first PCIe apparatus is a total quantity of lanes of the link between the first PCIe apparatus and the second PCIe apparatus. In this embodiment, there are 16 lanes of the link between the first PCIe apparatus and the second PCIe apparatus; therefore, the maximum lane width value that can be obtained by negotiating by the first PCIe apparatus with the second PCIe apparatus is 16, and the lane negotiation capability value M of the first PCIe apparatus is 16. The current lane width value N of the first PCIe apparatus is the current lane width value N obtained by re-negotiating by the first PCIe apparatus with the second PCIe apparatus. For example, as described above, there are 16 lanes connecting the first PCIe apparatus and the second PCIe apparatus, and when a fault occurs in the lane No. 3 between the first PCIe apparatus and the second PCIe apparatus, the first PCIe apparatus re-negotiates with the second PCIe apparatus according to the re-negotiation mechanism of the PCIe protocol, to obtain the current lane width value N being 2.

The CPU compares the acquired current lane width value N of the first PCIe apparatus and lane negotiation capability value M. In the present invention, the CPU compares N and M/2 according to a rule for a quantity of lanes of a link between two PCIe apparatuses.

If N≥M/2, the CPU does not perform processing. If the first PCIe apparatus does not receive, within predetermined time, an instruction sent by the CPU, the first PCIe apparatus continues to perform data transmission with the second PCIe apparatus by using N lanes obtained by means of re-negotiation. In this case, N≥M/2 indicates that the lane number of the faulty lane is greater than (M/2−1); because the link between the two PCIe apparatuses may include 1, 2, 4, 8, 16, or 32 lanes, the current lane width value N obtained by re-negotiating by the first PCIe apparatus with the second PCIe apparatus is M/2, and the first PCIe apparatus continues to perform data transmission with the second PCIe apparatus by using a link lane obtained by means of re-negotiation.

If N<M/2, the CPU instructs the first PCIe apparatus to perform a lane reversal operation on the link between the first PCIe apparatus and the second PCIe apparatus. When N<M/2, the current lane width obtained by re-negotiating by the first PCIe apparatus with the second PCIe apparatus is less than half a total link width, indicating that the lane number of the faulty lane is less than M/2. The lane reversal operation indicates that the first PCIe apparatus re-numbers the lanes of the link between the first PCIe apparatus and the second PCIe apparatus in a reverse direction. If the lanes of the link between the first PCIe apparatus and the second PCIe apparatus are originally numbered starting from 0 to 15 from left to right, then after the first PCIe apparatus performs the lane reversal operation, the lanes of the link between the first PCIe apparatus and the second PCIe apparatus are numbered from 0 to 15 from right to left, and vice versa. For example, in this embodiment, after the first PCIe apparatus performs the lane reversal operation, a lane number of the original lane No. 15 is changed from 15 to 0, that is, the original lane No. 15 is changed to a lane No. 0; a lane number of an original lane No. 14 is changed from 14 to 1, that is, the original lane No. 14 is changed to a lane No. 1; the rest can be deduced by analogy. Before instructing the first PCIe apparatus to perform the lane reversal operation, the CPU may further disable the lane No. 0 to a lane No. (M/2−1) between the first PCIe apparatus and the second PCIe apparatus. After the lanes No. 0 to No. (M/2−1) are disabled, the first PCIe apparatus does not need to number the disabled lanes any more. In this case, the first PCIe apparatus performs the lane reversal operation, changing a lane number of an original lane No. M to 0, changing a lane number of an original lane No. (M−1) to 1, and so on, until a lane number of an original lane No. M/2 is changed to (M/2−1).

After performing the lane reversal operation, the first PCIe apparatus performs re-negotiation on a new current lane width with the second PCIe apparatus, to obtain a new current lane width value N'. A method for re-negotiating, by the first PCIe apparatus, the current lane width with the second PCIe apparatus is the same as the foregoing re-negotiation method. According to a requirement of the PCIe protocol, the first PCIe apparatus performs negotiation starting from a lane with a smallest number after reversal, and performs link negotiation again with the second PCIe apparatus continuously upward in ascending order of lane number. That is, the first PCIe apparatus performs negotiation starting from a reversed lane No. 0, and then performs negotiation on a lane No. 1 and a lane No. 2 successively, until negotiation is performed on a lane No. (M/2−1). The first PCIe apparatus performs the lane reversal operation in a case of N<M/2; in this case, a lane number of the faulty lane is less than M/2, that is, the faulty lane is one of the lanes No. 0 to No. (M/2−1); the lanes No. 0 to No. (M/2−1) are disabled, but no fault occurs in the lanes No. M/2 to No. M, and data transmission can be performed. Therefore, after the first PCIe apparatus performs lane reversal, no fault occurs in the new lanes No. 0 to No. (M/2−1), and the new current lane width value N' obtained byre-negotiating by the first PCIe apparatus with the second PCIe apparatus is M/2.

When a fault occurs in a lane of a PCIe apparatus, using the solution of the present invention can ensure that a lane width obtained by means of re-negotiation is ½ of an original lane width regardless of a lane number of the faulty lane, avoiding that a lane value of the PCIe apparatus is greatly reduced when the lane number of the faulty lane is relatively small and therefore a speed of data transmission between PCIe apparatuses is affected.

Figure 3:
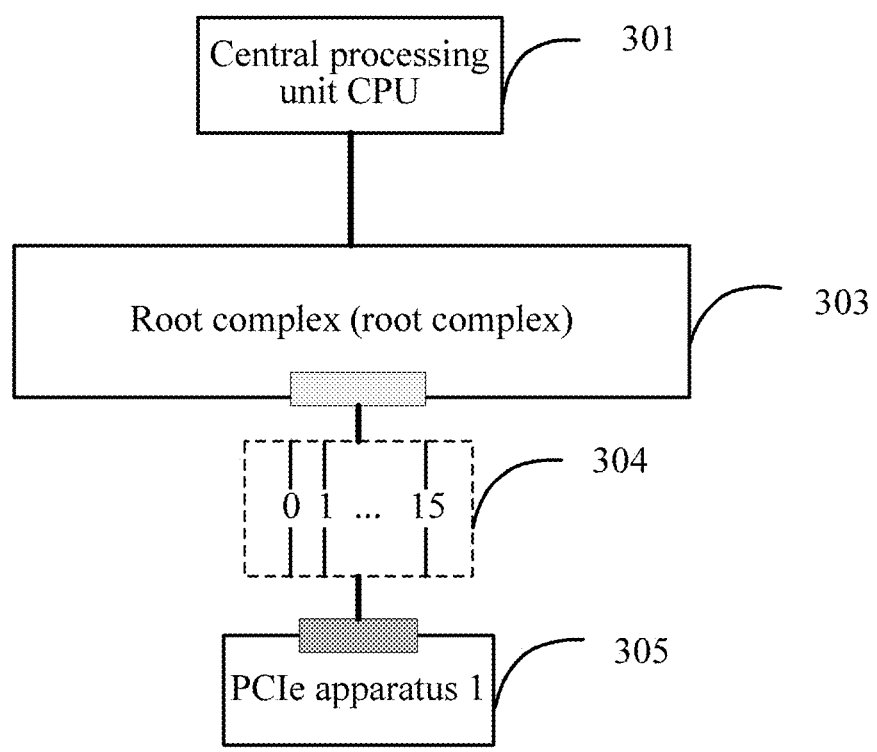
FIG. 3 is a simplified schematic diagram of another connection between PCIe apparatus disclosed in an embodiment of the present invention.
Figure 4:
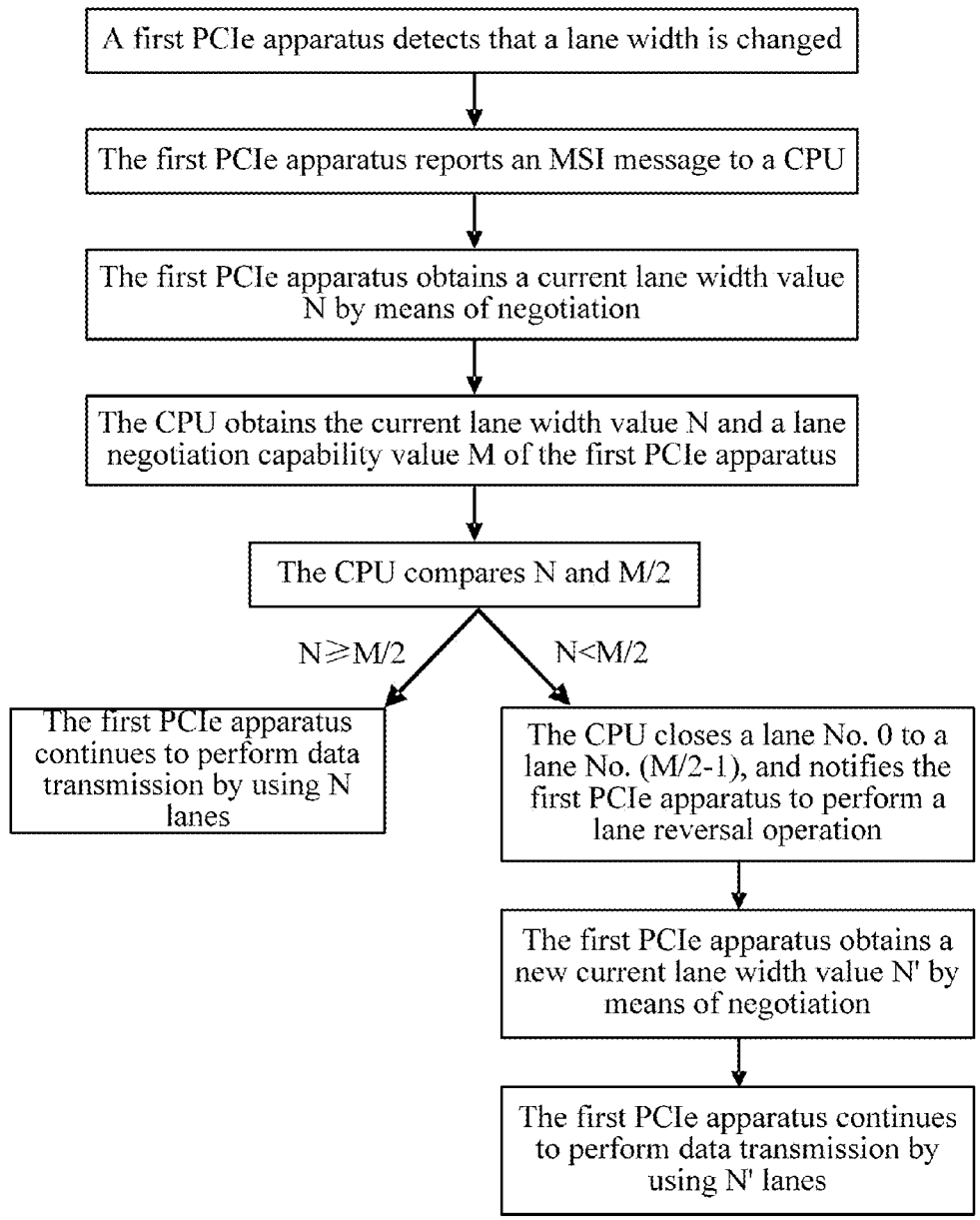
FIG. 4 is a flowchart of a method for processing a link fault of a PCIe apparatus disclosed in an embodiment of the present invention.

The technical solutions of the present invention are described and explained in detail in the following by using specific examples. A connection relationship between PCIe apparatuses is shown in FIG. 3, and for a method process, refer to FIG. 4.

The PCIe apparatus described in the following refers to a device communicating with another device by using the PCIe protocol. As shown in FIG. 3, a root complex 303 device represents a PCIe apparatus communicating with a downstream PCIe apparatus by using the PCIe protocol, that is, an upstream PCIe apparatus, such as the first PCIe apparatus shown in FIG. 2. A PCIe apparatus 1 305 represents a PCIe apparatus communicating with the upstream PCIe apparatus by using the PCIe protocol, that is, the downstream PCIe apparatus, such as the second PCIe apparatus shown in FIG. 2. In addition, the PCIe apparatus may be a physically independent device, or may be a chip integrated in a device, but is not limited to the PCIe apparatus shown in FIG. 1.

The root complex 303 is connected to an upstream port of the PCIe apparatus 1 305 by using a downstream port to implement data transmission. This embodiment is described by using an example in which there are 16 serdes circuits between the root complex 303 and the PCIe apparatus 1 305. The 16 serdes circuits form a link 304 between the root complex 303 and the PCIe apparatus 1 305, and one serdes is referred to as 1 lane. That is, a quantity of lanes between the root complex 303 and the PCIe apparatus 1 305 is 16, namely, X16. Moreover, the 16 lanes are continuously numbered from 0 to 15 from left to right. In this case, a maximum lane width value between the root complex 303 and the PCIe apparatus 1 305 is 16. A lane negotiation capability value M of the root complex 303 is equal to the maximum lane width value of the root complex 303, and the maximum lane width value of the root complex refers to a maximum quantity of lanes between the root complex 303 and the PCIe apparatus 1 305 that can be obtained by negotiating by the root complex 303. In this embodiment, the lane negotiation capability value M of the root complex 303 is equal to 16. The root complex 303 stores the lane negotiation capability value M of the root complex 303 in a register. According to stipulation of the PCIe protocol, a link between two PCIe apparatuses may include 1, 2, 4, 8, 16, or 32 lanes. This embodiment is described by using 16 lanes as an example. When a link 204 includes 1, 2, 4, 8, or 32 lanes, an implementation manner thereof is the same as an implementation manner of the 16 lanes.

The root complex may further be connected to other PCIe apparatuses. When the root complex is connected to multiple PCIe apparatuses, as shown in FIG. 1, the root complex may further be connected to a switch, and lane negotiation capability values between the root complex and the PCIe apparatuses may be separately recorded as M1, M2, and M3 to distinguish one from another. In the following method, description is provided by using an example in which the root complex is connected to one PCIe apparatus. When the root complex is connected to multiple PCIe apparatuses, a method for processing a fault in a lane between the root complex and any of the PCIe apparatuses is similar to that in this embodiment.

An MSI function is configured in the root complex. The root complex monitors a lane connected to the PCIe apparatus 1, and when detecting that a lane width between the root complex and the PCIe apparatus 1 is changed, the root complex reports an MSI message to a CPU. When the root complex performs data transmission with the PCIe apparatus 1, all lanes (that is, all serdes circuits) connected between the two devices are used. When a fault occurs in any one or more lanes thereof, the root complex detects that the lane width between the root complex and the PCIe apparatus 1 is changed, and the root complex generates an MSI message, and reports the MSI message to the CPU. The MSI message includes a device ID of the root complex, such as B:D:F (bus number:device number:function number) of a port of the root complex. The root complex stores a lane number of the faulty lane in the register. In this embodiment, a fault occurs in a lane No. 5 between the root complex and the PCIe apparatus 1, and the root complex detects that the fault occurs in the lane No. 5, and stores lane number information of the faulty lane in the register.

After reporting the MSI message to the CPU, the root complex re-negotiates with the PCIe apparatus 1 to obtain a current lane width value N. According to stipulation of the PCIe protocol, lane negotiation of a link between PCIe apparatuses starts from a lane with a smallest number, until negotiation is performed on a lane in which a fault occurs. In this way, lane numbers of lanes on which negotiation is successfully performed are still continuous, and a quantity of lanes that can be used to transmit data may be obtained. In this embodiment, the root complex negotiates with the PCIe apparatus 1 starting from a lane No. 0, and after negotiation performed on the lane No. 0 succeeds (that is, the lane No. 0 is normal and can be used to transmit data), negotiation is then performed on a lane No. 1. The rest can be deduced by analogy. When negotiation is performed on the lane No. 5, because the fault occurs in the lane No. 5, negotiation performed on the lane No. 5 is unsuccessful, and the root complex stops negotiating with the PCIe apparatus 1. Negotiation is successfully performed on the lanes No. 0 to No. 4 between the root complex and the PCIe apparatus 1, that is, negotiation is successfully performed on 5 lanes between the root complex and the PCIe apparatus 1. Then, according to stipulation of the PCIe protocol in which a link between two PCIe apparatuses may include 1, 2, 4, 8, 16, or 32 lanes, it is determined that the current lane width value N between the root complex and the PCIe apparatus 1 is 4. The root complex stores, in the register, the current lane width value N obtained by means of re-negotiation.

After receiving the MSI message reported by the root complex, the CPU enters an interrupt processing process. The CPU extracts an ID of the root complex from the MSI message, and then reads the current lane width value N and the lane negotiation capability value M of the root complex from the register of the root complex according to the acquired ID. The current lane width value N of the root complex is obtained by re-negotiating with the PCIe apparatus 1 after the root complex detects that a fault occurs in a lane between the root complex and the PCIe apparatus 1. In this embodiment, after the fault occurs in the serdes lane No. 5 between the root complex and the PCIe apparatus 1, the current lane width value N obtained by means of re-negotiation is 4. A specific negotiation method is described in the previous paragraph and is not separately described herein again. In addition, as described above, in this embodiment, there are 16 lanes between the root complex and the PCIe apparatus 1, and therefore the lane negotiation capability value M of the root complex is 16.

The CPU compares the current lane width value N of the root complex and the lane negotiation capability value M of the root complex. In the present invention, the CPU compares N and M/2 according to a rule for a quantity of lanes of a link between two PCIe apparatuses.

When N≥M/2, the current lane width value obtained by negotiating by the root complex with the PCIe apparatus 1 is half the maximum lane width value, and in this case, the CPU does not perform processing. If the root complex does not receive, within predetermined time, an instruction sent by the CPU, the root complex continues to perform data transmission with the PCIe apparatus 1 by using N link lanes obtained by means of re-negotiation.

When N<M/2, the current lane width value obtained by negotiating by the root complex with the PCIe apparatus 1 is less than half the maximum lane width value, and in this case, a width of the link between the root complex and the PCIe apparatus 1 is greatly reduced. In this case, the CPU disables the lane No. 0 to a lane No. (M/2−1) between the root complex and the PCIe apparatus 1, and instructs the root complex to start a lane reversal operation. The lane reversal operation indicates that a PCIe apparatus re-numbers lanes of a link between the PCIe apparatus and a downstream PCIe apparatus in a reverse direction. After starting the lane reversal operation, the root complex re-numbers the lanes between the root complex and the PCIe apparatus 1 in a reverse direction. The lanes between the root complex and the PCIe apparatus 1 are continuously numbered from left to right and in ascending order. After starting the lane reversal operation, the root complex continuously numbers the lanes between the root complex and the PCIe apparatus 1 from right to left and in ascending order. Related description of a specific numbering process is provided in the foregoing and is not separately described herein again. Because the original lanes No. 0 to No. (M/2−1) are disabled, the root complex does not number the disabled lanes after starting the lane reversal operation. In this way, the root complex continuously numbers the lanes between the root complex and the PCIe apparatus 1 starting from 0 to (M/2−1) from right to left and in ascending order.

After completing the lane reversal operation, the root complex then performs lane width negotiation with the PCIe apparatus 1 to obtain a new current lane width value N' of the link between the root complex and the PCIe apparatus. According to regulations of the PCIe protocol, negotiation between PCIe apparatuses starts from a lane with a smallest number, until negotiation is performed on a lane in which a fault occurs. After completing the lane reversal operation, the root complex performs negotiation starting from a new lane No. 0, until negotiation is performed on the lane in which the fault occurs, and determines a quantity of lanes that can be used for communication. The root complex then determines the new current lane width value N' according to a requirement, stipulated in the PCIe protocol, of the quantity of lanes of the link between the two PCIe apparatuses. The root complex continues to perform data transmission with the PCIe apparatus 1 by using lanes in a quantity of the new N' obtained by means of negotiation.

In this embodiment, the fault occurs in the lane No. 5, N is 4, M is 16, and 4<8 (N<M/2). The CPU disables the lanes No. 0 to No. (M/2−1) (that is, No. 7) between the root complex and the PCIe apparatus 1, and instructs the root complex to perform the lane reversal operation. After receiving the instruction, the root complex re-numbers the lanes between the root complex and the PCIe apparatus 1 in a reverse direction. A lane number of a lane No. 15 is changed from 15 to 0, that is, the original lane No. 15 is changed to a lane No. 0; a lane number of a lane No. 14 is changed from 14 to 1, that is, the original lane No. 14 is changed to a lane No. 1; the rest can be deduced by analogy. Because the lanes No. 0 to No. (M/2−1) (that is, No. 7) are disabled, a lane reversal process is ended after an original lane No. M/2 (that is, No. 8) is changed to a lane No. (M/2−1) (that is, No. 7). After completing lane reversal, the root complex performs lane re-negotiation with the PCIe apparatus 1, negotiation is performed starting from a new reversed lane No. 0, and negotiation is continuously performed upward according to lane numbers. Because data transmission can be performed on the original lane No. 8 to the original lane No. 15 in which no fault occurs, negotiation is successfully performed on 8 lanes when the root complex performs lane renegotiation with the PCIe apparatus 1 again. Further, because the PCIe protocol stipulates that a lane width is one of 1, 2, 4, 8, 16, and 32, the new current lane width value N' obtained by re-negotiating by the root complex with the PCIe apparatus 1 is 8.

The root complex continues to perform data transmission by using a new reversed lane No. 0 to a new reversed lane No. 7 (that is, 8 lanes) between the root complex and the PCIe apparatus 1. A specific data transmission process is similar to an existing implementation manner, which is not separately described herein again.

In this way, in a case in which a fault occurs in a lane of a link between two PCIe apparatuses, using the solution provided in the present invention can ensure that lanes in a quantity that is half a lane negotiation capability value of the PCIe apparatus can be used regardless of a lane number of the faulty lane, which ensures a transmission speed and performance of the link between the PCIe apparatuses to the greatest extent.

The present invention further provides a system for processing a link fault of a PCIe apparatus, and composition of the system is shown in FIG. 2. The system includes a CPU 201, a first PCIe apparatus 203, and a second PCIe apparatus

205. The first PCIe apparatus and the second PCIe apparatus are connected by using multiple Serializer/De-Serializer (serdes) circuits. The multiple serdes circuits form a link 204 that is used to transmit data between the first PCIe apparatus and the second PCIe apparatus, each serdes is a lane, and lanes are continuously numbered in an order. There may be 1, 2, 4, 8, 16, or 32 serdes circuits between the two PCIe apparatuses, and this embodiment is described by using 16 serdes circuits as an example. That is, there are 16 serdes circuits, namely, 16 lanes, between the first PCIe apparatus 203 and the second PCIe apparatus 205, and the 16 lanes are continuously and sequentially numbered starting from 0 to 15 from left to right. A lane with a number 0 is a lane No. 0, and by analogy, a lane with a number 15 is a lane No. 15. The serdes uses an existing serdes structure and supports an existing function, which is not separately described herein again. In this embodiment of the present invention, no matter how many serdes circuits are in the link, implementation principles thereof are similar.

An MSI function is configured in the first PCIe apparatus 203. When detecting that a fault occurs in one or more lanes of the link 204 connected to the second PCIe apparatus 205, the first PCIe apparatus 203 reports an MSI message to the CPU 201, where the MSI message carries a device ID of the first PCIe apparatus 203.

The first PCIe apparatus 203 performs lane re-negotiation with the second PCIe apparatus 205 according to a re-negotiation mechanism of the PCIe protocol, to obtain a current lane width value N of the link 204 between the first PCIe apparatus 203 and the second PCIe apparatus 205. During lane re-negotiation, according to a lane negotiation mechanism stipulated in the PCIe protocol, the first PCIe apparatus 203 continuously performs link negotiation again with the second PCIe apparatus 205 upward in ascending order of lane number, starting from a lane with a smallest lane number until negotiation is performed on the faulty lane. Because negotiation cannot be successfully performed on the faulty lane, the re-negotiation process is terminated. The first PCIe apparatus 203 further determines the current lane width value N of the link according to a quantity of lanes of a link between two PCIe apparatuses that is stipulated in the PCIe protocol.

Because lane numbers need to be continuous, and link negotiation starts from a lane with a smallest number, a quantity of lanes obtained by means of re-negotiation varies with a lane number of a faulty lane, and uncertainty exists. When the lane number of the faulty lane is relatively small, the quantity of lanes obtained by means of re-negotiation is also greatly reduced, that is, the obtained current lane width value N is greatly reduced, therefore severely affecting performance of data transmission between the two PCIe apparatuses.

In this embodiment of the present invention, after receiving the MSI message reported by the first PCIe apparatus 203, the CPU 201 enters an interrupt processing process. The CPU 201 acquires the current lane width value N of the first PCIe apparatus 203 and a lane negotiation capability value M of the first PCIe apparatus 203 from the first PCIe apparatus 203 according to the device ID of the first PCIe apparatus 203 in the MSI message. The lane negotiation capability value M of the first PCIe apparatus 203 refers to a maximum lane width value that can be obtained by negotiating by the first PCIe apparatus 203 with the second PCIe apparatus 205, that is, a total quantity of lanes between the first PCIe apparatus 203 and the second PCIe apparatus 205. In this embodiment, there are 16 lanes between the first PCIe apparatus 203 and the second PCIe apparatus 205; therefore, the maximum lane width value that can be obtained by negotiating by the first PCIe apparatus 203 with the second PCIe apparatus 205 is 16, and the lane negotiation capability value M of the first PCIe apparatus 203 is 16. The current lane width value N of the first PCIe apparatus 203 is the current lane width value N obtained by re-negotiating by the first PCIe apparatus 203 with the second PCIe apparatus 205.

The CPU 201 compares the acquired current lane width value N of the first PCIe apparatus 203 and the lane negotiation capability value M. In the present invention, the CPU 201 compares N and M/2 according to a rule for a quantity of lanes of a link between two PCIe apparatuses.

If N≥M/2, the first PCIe apparatus 203 continues to perform data transmission with the second PCIe apparatus 205 by using a link lane obtained by means of re-negotiation. In this case, N≥M/2 indicates that the lane number of the faulty lane is greater than (M/2−1); because the link between the two PCIe apparatuses may include 1, 2, 4, 8, 16, or 32 lanes, the current lane width value N obtained by re-negotiating by the first PCIe apparatus 203 with the second PCIe apparatus 205 is M/2, and the first PCIe apparatus 203 continues to perform data transmission with the second PCIe apparatus 205 by using the link lane obtained by means of re-negotiation. The CPU 201 does not perform processing in such a condition. The first PCIe apparatus 203 may set a time period, and if the first PCIe apparatus 203 does not receive an instruction of the CPU 201 within the set time period, the first PCIe apparatus 203 continues to perform data transmission with the second PCIe apparatus 205 by using the link lane obtained by means of re-negotiation.

If N<M/2, the CPU 201 instructs the first PCIe apparatus 203 to perform a lane reversal operation. When N<M/2, the current lane width obtained by re-negotiating by the first PCIe apparatus 203 with the second PCIe apparatus 205 is less than half a total link width, indicating that the lane number of the faulty lane is less than M/2. The lane reversal operation indicates that the first PCIe apparatus 203 re-numbers the lanes between the first PCIe apparatus 203 and the second PCIe apparatus 205 in a reverse direction. For example, in this embodiment, the lanes between the first PCIe apparatus 203 and the second PCIe apparatus 205 are originally numbered starting from 0 to 15 from left to right. After the first PCIe apparatus 203 performs the lane reversal operation, a lane number of the original lane No. 15 is changed from 15 to 0, that is, the original lane No. 15 is changed to a lane No. 0; a lane number of an original lane No. 14 is changed from 14 to 1, that is, the original lane No. 14 is changed to a lane No. 1; the rest can be deduced by analogy. Before instructing the first PCIe apparatus to perform the lane reversal operation, the CPU 201 may further disable the lane No. 0 to a lane No. (M/2−1) between the first PCIe apparatus and the second PCIe apparatus. After the lanes No. 0 to No. (M/2−1) are disabled, the first PCIe apparatus 203 performs the lane reversal operation, changing a lane number of an original lane No. M to 0, changing a lane number of an original lane No. (M−1) to 1, and so on, until a lane number of an original lane No. M/2 is changed to (M/2−1). After performing the lane reversal operation, the first PCIe apparatus 203 performs re-negotiation on a new current lane width with the second PCIe apparatus 205, to obtain a new current lane width value N'. A method for re-negotiating, by the first PCIe apparatus 203, the current lane width with the second PCIe apparatus 205 is the same as the foregoing re-negotiation method. According to a requirement of the PCIe protocol, the first PCIe apparatus 203 performs negotiation starting from the lane with a smallest number after reversal, and performs link negotiation again with the second PCIe apparatus 205 continuously upward in ascending order of lane number. That is, the first PCIe apparatus 203 performs negotiation starting from a reversed lane No. 0, and then performs negotiation on a lane No. 1 and a lane No. 2 successively, until negotiation is performed on a lane No. (M/2−1). The first PCIe apparatus 203 performs the lane reversal operation in a case of N<M/2; in this case, a lane number of the faulty lane is less than M/2, that is, the faulty lane is one of the lanes No. 0 to No. (M/2−1); the lanes No. 0 to No. (M/2−1) are disabled, but no fault occurs in the lanes No. M/2 to No. M, and data transmission can be performed. Therefore, after the first PCIe apparatus 203 performs lane reversal, no fault occurs in the new lanes No. 0 to No. (M/2−1), and the new current lane width value N' obtained by re-negotiating by the first PCIe apparatus 203 with the second PCIe apparatus 205 is M/2. The first PCIe apparatus 203 continues to perform data transmission with the second PCIe apparatus 205 by using a new lane link obtained by means of re-negotiation.

When a fault occurs in a lane of a PCIe apparatus, using the solution of the present invention can ensure that a lane width obtained by means of re-negotiation is ½ of an original lane width regardless of a lane number of the faulty lane, avoiding that a lane value of the PCIe apparatus is greatly reduced when the lane number of the faulty lane is relatively small and therefore a speed of data transmission between PCIe apparatus is affected.

Figure 5:
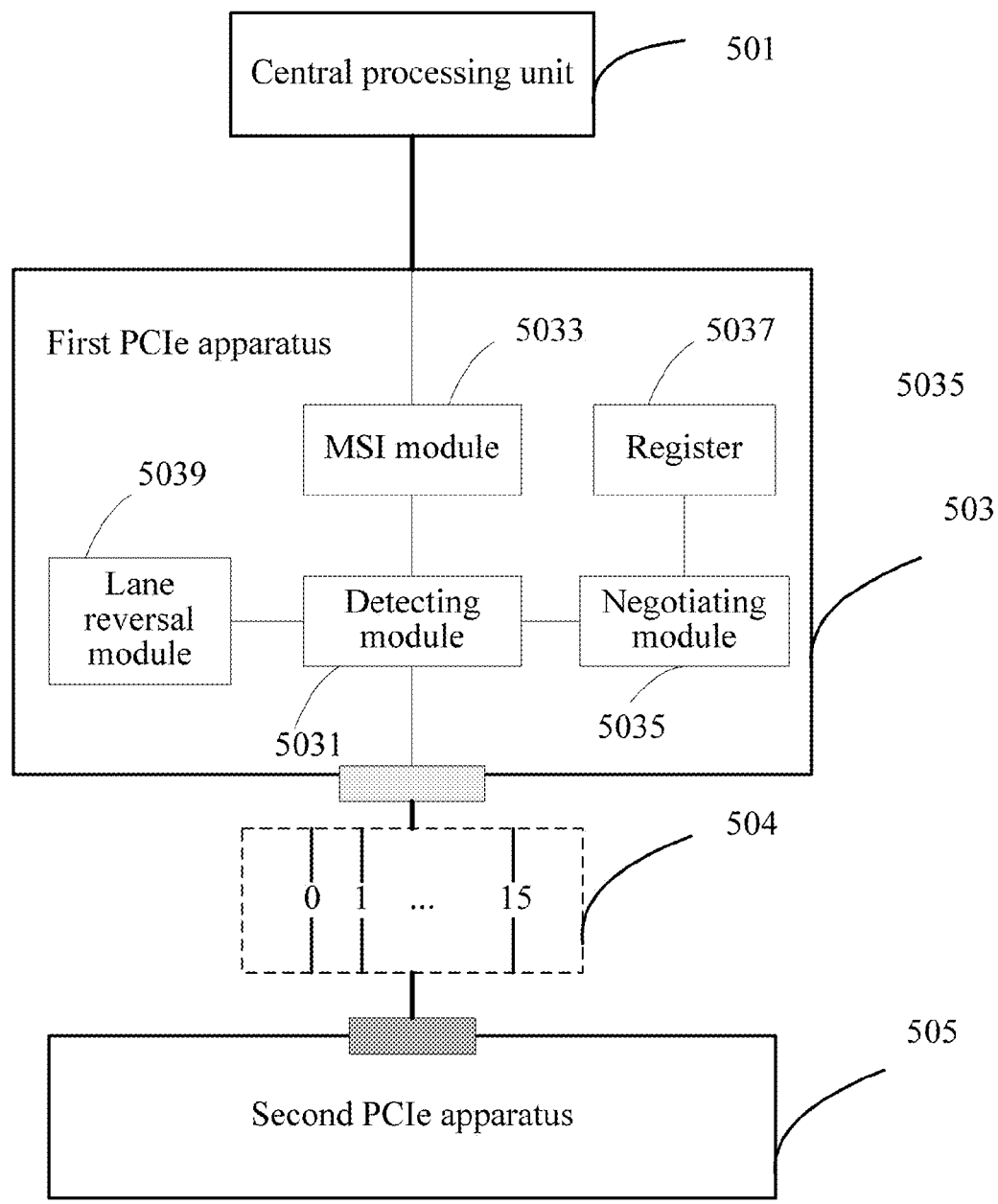
FIG. 5 is a schematic structural diagram of a PCIe apparatus disclosed in an embodiment of the present invention.

For an internal structural diagram of a first PCIe apparatus 503 in an embodiment of the present invention, refer to FIG. 5. As shown in FIG. 5, the first PCIe apparatus 503 includes a detecting module 5031, an MSI module 5033, a negotiating module 5035, a register 5037, and a lane reversal module 5039.

The detecting module 5031 is configured to monitor a communication condition of a link 504 between the first PCIe apparatus 503 and a second PCIe apparatus 505. The link 504 between the first PCIe apparatus 503 and the second PCIe apparatus 504 includes multiple serdes, circuits, and each serdes is a lane. When detecting that a fault occurs in one or more lanes of the link 504, the detecting module 5031 sends a lane fault instruction message to the MSI module 5033, and sends information about the faulty lane to the register 5037 for storage.

The MSI module 5033 is configured to: after receiving the lane fault instruction message of the detecting module 5031, send an MSI message to a CPU 501. The sent MSI message carries a device ID of the first PCIe apparatus 503.

The negotiating module 5035 is configured to negotiate a lane width between the first PCIe apparatus 503 and the second PCIe apparatus 505. Lanes of the link between the two PCIe apparatuses are continuously numbered in an order. The link between the two PCIe apparatuses may include 1, 2, 4, 8, 16, or 32 lanes, and this embodiment is described by using 16 lanes as an example. For example, as shown in FIG. 5, the lanes of the link 504 between the first PCIe apparatus 503 and the second PCIe apparatus 505 are continuously numbered from left to right starting from 0. There are a lane No. 0, a lane No. 1, a lane No. 2 . . . , and a lane No. 15 successively from left to right. According to a negotiation mechanism of the PCIe protocol, when link negotiation is performed, negotiation is performed starting from a lane with a smallest number, and link negotiation is performed again with the second PCIe apparatus 505 continuously upward in ascending order of lane number, until negotiation is performed on the faulty lane. Because negotiation cannot be successfully performed on the faulty lane, a re-negotiation process is terminated. The first PCIe apparatus 503 further determines a current lane width value N of the link between the first PCIe apparatus 503 and the second PCIe apparatus 505 according to a quantity of lanes of a link between two PCIe apparatuses that is stipulated in the PCIe protocol.

The register 5037 is configured to store information, including information, such as a lane negotiation capability value M and the current lane width value N of the first PCIe apparatus 503.

The lane reversal module 5039 is configured to, after receiving an instruction of performing a lane reversal operation, perform the lane reversal operation on the lanes in the link 504.

When detecting that the fault occurs in the one or more lanes of the link 504, the detecting module 5031 sends the lane fault instruction message to the MSI module 5033, and sends the information about the faulty lane to the register 5037 for storage.

The negotiating module 5035 initiates re-negotiation, and determines the current lane width value N between the first PCIe apparatus 503 and the second PCIe apparatus 505. The negotiating module 5035 performs negotiation starting from a lane with a smallest number in the link 504, that is, performs negotiation starting from a lane No. 0; after negotiation is successfully performed on the lane No. 0, negotiation is performed on a lane No. 1, and the rest can be deduced by analogy, until negotiation is performed on the faulty lane. In this embodiment, it is assumed that the fault occurs in a lane No. 5 in the link 504. When the negotiating module 5035 initiates re-negotiation, negotiation is successfully performed on the lane No. 0 to a lane No. 4. In this case, 5 lanes can be used for communication, but the link between the two PCIe apparatuses may include 1, 2, 4, 8, 16, or 32 lanes, and therefore the current lane width value N between the first PCIe apparatus 503 and the second PCIe apparatus 505 is 4.

After receiving the MSI message sent by the MSI module 5033, the CPU 501 acquires a lane negotiation capability value M and the current lane width value N of the first PCIe apparatus from the register 5037 of the first PCIe apparatus 503 according to the device ID carried in the MSI message. In this embodiment, a quantity of lanes of the link between the first PCIe apparatus and the second PCIe apparatus is 16, and therefore, the lane negotiation capability value M of the first PCIe apparatus that is acquired by the CPU 501 is 16. The current lane width value N is 4.

The CPU 501 compares the acquired lane negotiation capability value M and the current lane width value N. In the present invention, the CPU 501 compares N and M/2 according to a rule for a quantity of lanes of a link between two PCIe apparatuses.

When N<M/2, the CPU 501 instructs the lane reversal module 5039 of the first PCIe apparatus 503 to perform a lane reversal operation that is, to re-number the lanes of the link 504 between the first PCIe apparatus 503 and the second PCIe apparatus 505 in a reverse direction. For example, as shown in FIG. 5, currently, the lanes of the link 504 are continuously numbered starting from 0 to 15 from left to right. Performing the lane reversal operation means: a lane number of the lane No. 15 of the link 504 is changed from 15 to 0, that is, the lane No. 15 is changed to the lane No. 0; a lane number of a lane No. 14 is changed to 1, that is, the lane No. 14 is changed to the lane No. 1; the rest can be deduced by analogy. After the lane reversal operation is performed, the lanes of the link 504 are continuously numbered starting from 0 to 15 from right to left. After the lane reversal module 5039 of the first PCIe apparatus 503 completes the lane reversal operation, the negotiating module 5035 then re-initiates lane negotiation on the link 504 between the first PCIe apparatus 503 and the second PCIe apparatus 505, and determines a new current lane width value N'; a negotiation manner is the same as the foregoing manner, which is not separately described herein again. The first PCIe apparatus 503 performs data transmission with the second PCIe apparatus 505 by using the new current lane width obtained by means of negotiation. Because N<M/2 indicates that a lane number of the faulty lane is less than (M/2−1), the new current lane width value obtained by means of re-negotiation is greater than or equal to M/2. In this case, it can be ensured that a lane width value obtained by means of re-negotiation after a fault occurs in a lane of the link 504 is greater than or equal to M/2, which ensures transmission performance of the link 504.

When N<M/2, the CPU 501 may further first disable the lane No. 0 to a lane No. (M/2−1) of the link 504 between the first PCIe apparatus 503 and the second PCIe apparatus 505, and then instruct the lane reversal module 5039 of the first PCIe apparatus 503 to perform the lane reversal operation. Because N<M/2, and the current lane width obtained by means of negotiation is less than M/2, it indicates that the lane number of the faulty lane is less than (M/2−1). No fault occurs in a lane No. M/2 to a lane No. M, and data transmission can be performed. In this way, the CPU 501 disables the lanes No. 0 to No. (M/2−1) of the link 504; when performing the lane reversal operation, the lane reversal module 5039 of the first PCIe apparatus 503 changes a lane number of the lane No. M from M to 0, changes a lane number of a lane No. (M−1) from (M−1) to 0, and so on, until a lane number of the lane No. M/2 is changed from M/2 to (M/2−1). Because the original lane No. 0 to the original lane No. (M/2−1) of the link are disabled, the lane reversal module 5039 of the first PCIe apparatus 503 does not perform lane reversal on these disabled lanes any more. After lane reversal is completed, the negotiating module 5035 re-initiates lane negotiation on the link 504 between the first PCIe apparatus 503 and the second PCIe apparatus 505, and determines the new current lane width value N'. In this case, a new lane No. 0 to a new lane No. (M/2−1) of the link 504 can be used for communication. That is, after a fault occurs in a lane of the link 504, a lane width value obtained by means of re-negotiation is equal to M/2, ensuring transmission performance of the link 504.

When N≥M/2, it indicates that the current lane width of the link between the first PCIe apparatus 503 and the second PCIe apparatus 505 is greater than or equal to M/2, and in this case, performance of the link 504 is retained to the greatest extent. The CPU 501 does not perform processing. If the first PCIe apparatus 503 does not receive an instruction of the CPU 501 within a predetermined time limit, the first PCIe apparatus 503 performs data transmission with the second PCIe apparatus 505 by using the current lane width N obtained by means of negotiation. Transmission performance of the link 504 is also ensured.

In this embodiment of the present invention, the lane negotiation capability value M of the first PCIe apparatus 503 is 16, the fault occurs in the lane No. 5 of the link 504, and the current lane width value N obtained by re-negotiating by the negotiation module 5035 of the first PCIe apparatus with the second PCIe apparatus 505 is 4. In this case, 4<16/2, that is, N<M/2; the CPU 501 disables the lane No. 0 to a lane No. 7 of the link 504, and instructs the lane reversal module 5039 of the first PCIe apparatus 503 to perform lane reversal. The lane reversal module 5039 of the first PCIe apparatus 503 changes the lane number of the lane No. 15 of the link 504 to 0, and changes the lane number of the lane No. 14 to 1, until a lane number of a lane No. 8 is changed to 7. Because the original lane No. 0 to the original lane No. 7 of the link 504 are disabled, the lane reversal module 5039 does not number them anymore. In this way, the link 504 between the first PCIe apparatus 503 and the second PCIe apparatus 505 now includes 8 lanes. The negotiating module 5035 of the first PCIe apparatus 503 performs lane re-negotiation with the second PCIe apparatus 505, to obtain a new current lane width value N' being 8. The first PCIe apparatus 503 continues to perform data transmission with the second PCIe apparatus 505 by using 8 lanes of the link 504.

In this way, by using the technical solutions provided in the present invention, when a fault occurs in a lane of a link between two PCIe apparatuses, it can be ensured that half lanes of the original link can be provided for the two PCIe apparatuses to continue to perform data transmission regardless of a number of the faulty lane, which eases restriction of a lane number of a faulty lane that is imposed on a link width in the prior art, so that an optimal link width can be achieved after re-negotiation.

It should further be noted that in this specification, relational terms such as first and second are only used to distinguish one entity or operation from another, and do not necessarily require or imply that any actual relationship or sequence exists between these entities or operations. Moreover, the terms "include", "include", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

A person skilled in the art may implement or use the present invention according to the foregoing description of the disclosed embodiments. An ordinary principle defined in this specification may be implemented in other embodiments without departing from the spirit or the scope of the present invention. Therefore, the present invention will not be limited to the embodiments described in this specification but extends to the widest scope that complies with the principles and novelty disclosed in this specification.

What is claimed is:

1. A method performed by a Peripheral Component Interconnect Express (PCIe) system that includes a processor and a first PCIe apparatus, the method comprising:
   determining, by the first PCIe apparatus, that at least one of a plurality of lanes of a link between the first PCIe apparatus and a second PCIe apparatus is disabled, wherein the link includes a number M of lanes, which are numbered in a first order, and wherein M is a total number of lanes of the link between the first PCIe apparatus and the second PCIe apparatus;
   reporting, by the first PCIe apparatus, a device identifier (ID) of the first PCIe apparatus when the at least one of the lanes of the link between the first PCIe apparatus and the second PCIe apparatus is disabled;
   performing a first lane negotiation with the second PCIe apparatus;

obtaining, by the first PCIe apparatus, a number N of available lanes of the link after performing the first lane negotiation with the second PCIe apparatus;

obtaining, by the processor, the number N and the number M;

determining, by the processor, whether N is less than M/2;

performing, by the first PCIe apparatus, data transmission using the N lanes in the link and without renumbering any of the lanes in the link when N is greater than or equal to M/2;

re-numbering, by the first PCIe apparatus, at least some of the lanes of the link in a reverse order opposite to the first order when N is less than M/2;

performing, by the first PCIe apparatus, a second lane negotiation with the second PCIe apparatus to obtain a number N' of available lanes when N is less than M/2; and performing by the first PCIe apparatus, data transmission using the N' lanes in the link when N is less than M/2.

2. The method according to claim 1, further comprising disabling half of the lanes numbered continuously from 0 to M/2-1 when is less than M/2.

3. The method according to claim 2, wherein N is one of 1, 2, 4, 8, 16 or 32.

4. The method according to claim 3, wherein N' is one of 1, 2, 4, 8, 16, or 32.

5. A Peripheral Component Interconnect Express (PCIe) system comprising:
a processor; and
a first PCIe apparatus coupled to the processor and configured to:
determine that at least one of a plurality of lanes of a link between the first PCIe apparatus and a second PCIe apparatus is disabled, wherein the link includes a number M of lanes, which are numbered in a first order, and wherein M is a total number of lanes of the link between the first PCIe apparatus and the second PCIe apparatus;
report a device identifier (ID) of the first PCIe apparatus when at least one of lanes of the link between the first PCIe apparatus and the second PCIe apparatus is disabled;
performing a first lane negotiation with the second PCIe apparatus; and
obtain a number N of available lanes of the link after performing the first lane negotiation with the second PCIe apparatus,
wherein the processor is configured to:
obtain the number N and a number M; and
determine whether N is less than M/2, and;
wherein the first PCIe apparatus is further configured to:
perform data transmission using the N lanes in the link and without renumbering any of the lanes in the link when N is greater than or equal to M/2;
re-number at least some of the lanes of the link in a reverse order opposite to the first order when N is less than M/2;
perform a second lane negotiation with the second PCIe apparatus to obtain a number N' of available lanes when N is less than M/2; and
perform data transmission using the N' lanes in the link when N is less than M/2.

6. The system according to claim 5, wherein the first PCIe apparatus is further configured to disable half of the lanes numbered continuously from 0 to M/2-1 when N is less than M/2.

7. The system according to claim 5, wherein N is one of 1, 2, 4, 8, 16 or 32.

8. The system according to claim 5, wherein N' is one of 1, 2, 4, 8, 16, or 32.

9. A method performed by a first Peripheral Component Interconnect Express (PCIe) component comprising:
a memory comprising instructions; and
a processor coupled to the memory, wherein the processor is configured to execute the instructions to:
determine that at least one of a plurality of lanes of a link between the first PCIe component and a second PCIe component is disabled, wherein the link includes a number M of lanes, which are numbered in a first order, and wherein M is a total number of lanes of the link between the first PCIe component and the second PCIe component;
performing a first lane negotiation with the second PCIe component to obtain a number N of available lanes of the link after performing the first lane negotiation with the second PCIe component;
determining whether N is less than M/2;
performing data transmission using the N lanes in the link and without renumbering any of the lanes in the link when N is greater than or equal to M/2;
re-numbering at least some of the lanes of the link in a reverse order opposite to the first order when N is less than M/2;
performing a second lane negotiation with the second PCIe component to obtain a number N' of available lanes when N is less than M/2; and
performing data transmission using the N' lanes in the link when N is less than M/2.

10. The system according to claim 9, wherein N is one of 1, 2, 4, 8, 16 or 32.

11. The system according to claim 9, wherein N' is one of 1, 2, 4, 8, 16, or 32.

12. The system according to claim 9, further comprising disabling half of the lanes numbered continuously from 0 to M/2-1 when N is less than M/2.

* * * * *

UNITED STATES PATENT AND TRADEMARK OFFICE
CERTIFICATE OF CORRECTION

PATENT NO. : 9,785,530 B2
APPLICATION NO. : 14/806078
DATED : October 10, 2017
INVENTOR(S) : Ge Du It is certified that error appears in the above-identified patent and that said Letters Patent is hereby corrected as shown below:

In the Claims

Column 19, Lines 20-22, Claim 2, should read:
2. The method according to claim 1, further comprising disabling half of the lanes numbered continuously from 0 to M/2-1 based when N is less than M/2.

Column 19, Lines 27-54, through Column 20, Lines 1-8, Claim 5 should read:
5. A Peripheral Component Interconnect Express (PCIe) system comprising:
    a processor; and
    a first PCIe apparatus coupled to the processor and configured to:
        determine that at least one of a plurality of lanes of a link between the first PCIe apparatus and a second PCIe apparatus is disabled, wherein the link includes a number M of lanes, which are numbered in a first order, and wherein M is a total number of lanes of the link between the first PCIe apparatus and the second PCIe apparatus;
        report a device identifier (ID) of the first PCIe apparatus when at least one of lanes of the link between the first PCIe apparatus and the second PCIe apparatus is disabled;
performing a first lane negotiation with the second PCIe apparatus; and
        obtain a number N of available lanes of the link after performing the first lane negotiation with the second PCIe apparatus,
wherein the processor is configured to:
        obtain the number N and a number M; and
        determine whether N is less than M/2, and
wherein the first PCIe apparatus is further configured to:
        perform data transmission using the N lanes in the link and without renumbering any of the lanes in the link when N is greater than or equal to M/2;
        re-number at least some of the lanes of the link in a reverse order opposite to the first order when N is less than M/2;
        perform a second lane negotiation with the second PCIe apparatus to obtain a number N' of available lanes when N is less than M/2; and
        perform data transmission using the N' lanes in the link when N is less than M/2.

Signed and Sealed this
Twenty-sixth Day of December, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,785,530 B2

Column 20, Lines 47-51, Claims 10, 11 and 12 should read:

10. The method according to claim 9, wherein N is one of 1, 2, 4, 8, 16 or 32.

11. The method according to claim 9, wherein N' is one of 1, 2, 4, 8, 16, or 32.

12. The method according to claim 9, further comprising disabling half of the lanes numbered continuously from 0 to M/2-1 when N is less than M/2.